United States Patent Office 2,852,471
Patented Sept. 16, 1958

2,852,471

DESEALANT COMPOSITION AND PROCESS

Don C. Atkins, Jr., Whittier, and Richard V. Edds, Los Angeles, Calif., assignors to Turco Products, Inc., Los Angeles, Calif., a corporation of California No Drawing. Application February 21, 1955
Serial No. 489,774

21 Claims. (Cl. 252—171)

This invention relates to the removal of linings from motor fuel tanks such as are commonly provided in the wings of modern aircraft.

More particularly the invention involves compositions for the removal of such linings or sealants, such compositions being sometimes referred to as desealants.

Desealants are of two general classes: (1) Those which remove the sealant by breaking the bond between the sealant and the metallic surface of the tank, these being commonly known as the "bond release" type; (2) the "dissolving-disintegrating" type in which the sealant is dissolved and/or disintegrated or partially dissolved by the desealant material. Either of these types can be used by the following methods of application: (a) the method known as "fill and drain" in which the fuel tank is filled with the desealant material and let stand for a considerable length of time, for example 24 hours or more, the tanks then drained, and the loosened sealant material removed mechanically; (b) the method known as the "spray method" in which the desealant material is continually sprayed onto the surfaces being treated, being pumped under pressure through spray nozzles, which may be rotating nozzles if desired, the liquid being continuously drained from the surfaces being treated, strained, and recirculated until the sealant material is substantially or all removed; (c) the method known as the "spray-on" method" in which the desealant material is sprayed onto the surfaces to be treated, resprayed as required to keep the surfaces wetted with the desealant material, until the sealant material is substantially or all removed or loosened.

It is a principal object of this invention to provide for the industry a fluid, thin-bodied, stable, non-separating, non-flammable, dissolving-disintegrating type of desealant, which can be sprayed readily, will cling well to vertical sealant surfaces, and also will rinse well with warm or cold water.

It is also an object of the present invention to provide a desealant material of appropriate viscosity, which can be used by the "fill-and-drain method" of desealing which requires no mixing at the time of use, and which is effective on most synthetic sealants and the like, such as Buna-N types of synthetic rubber, Thiokol types of sealants and the like. By "Buna N" is meant co-polymers of butadiene and acrylonitrile sold under the trademark Buna N and by "Thiokol" is meant polymeric reaction products of organic dihalides and inorganic polysulfides sold under the trademark Thiokol. While this desealant can be used by the "spray-on method," best results are obtained by the "spray method" and the "fill and drain method."

It is a still further object to use a desealant which acts well to remove the sealant by dissolving-disintegrtaion action.

More particularly, another object of the invention is to employ organic phosphites or halo phosphites as activating compounds in desealants containing relatively large proportions of chlorinated hydrocarbons, or other halogenated hydrocarbons of relative non-corrosivity, such as methylene chloride or ethylene dichloride or trichloroethylene and the like, the organic groups of the phosphites being alkyl or aryl in nature, such phosphites being primary, secondary, or tertiary.

A particular desealant which we have found very valuable has been of the general formula:

| | Percent |
|---|---|
| Organic phosphite about | 5 |
| Halogenated hydrocarbon solvent about | 95 |

More particularly, various phosphites of the indicated nature which have been employed are tri-2-propyl phosphite, tri-ethyl phosphite, tri-butyl phosphite, tri-iso-octyl phosphite, tri-hexyl phosphite, tri-2-ethyl hexyl phosphite ethyl phosphite, di-ethyl phosphite and the like. Again, the alkyl and aryl phosphites indicated may be halo phosphites such as ethyl dichloro phosphite, secondary di-ethyl thio phosphite, secondary ethyl di-bromo thio phosphite, and the like. Other aryl phosphites than the mentioned di-phenyl phosphite may be tri-phenyl phosphite, di-benzyl phosphite, bis-(di-phenyl methyl) phosphite, corresponding thio phosphites, and so on.

While the chlorinated hydrocarbon which has generally been employed as the solvent has been methylene chloride, ethylene chloride has been used and so has trichloroethylene. Mixtures of the above have also been used. Additionally, other halogenated hydrocarbons are useful as solvents, such as carbon tetrachloride, methylene bromide, ethylene bromide, and corresponding halogenated aromatics such as those mono, di and tri bromobenzenes and mono, di and tri chlorobenzenes which are normally liquid themselves, or are usable as liquid mixtures such as 20% to 30% trichlorobenzene dissolved in carbon tetrachloride.

More specifically, compositions of the following examples have been found very useful:

Example A:                                                Percent
    Tri-2-propyl phosphite _____ 5
    Methylene chloride _____ 95
Example B:
    Triethyl or tributyl phosphite _____ 5
    Methylene chloride _____ 95
Example C:
    Diphenyl phosphite _____ 5
    Methylene chloride _____ 95
Example D:
    (s)-Diethyl thiophosphite _____ 5
    Methylene chloride _____ 95
Example E:
    Ethyl dichlorophosphite _____ 5
    Methylene chloride _____ 95

As the above compositions indicate, the preferred formulations usually include about 5% of the phosphite to 95% of the halogenated hydrocarbon solvent. These proportions may, however, be varied considerably, with the observation that the minimum amount of phosphite, in relation to the solvent, which has any appreciable effect is 0.5%, and that the maximum amount of phosphite from any practical or commercial standpoint is about 20%.

It is often desirable to employ in addition to the phosphite and the halogenated hydrocarbon solvent, such constituents as viscosity modifiers, corrosion inhibitors, wetting agents, vapor pressure depressants, and perhaps another solvent which replaces part of the halogenated hydrocarbon. Such other solvent may be for example an alcohol, such as ethyl alcohol, in proportions considerably less than the halogenated hydrocarbon. From the standpoint of viscosity modifiers a limited amount of methyl cellulose has been employed, but other viscosity modifiers such as ethyl cellulose may be employed. Paraffin wax is very desirable as a vapor pressure depressant, but other depressants are exemplified by chlorinated paraffin wax and chlorosulfonated polyethylene. As to alcohols as partial replacements for the halogenated hydrocarbon solvent, the mentioned ethyl alcohol may be replaced by isopropanol or butanol, or other mono- or polyhydric aliphatic alcohol having a maximum of 6 carbon atom chain length.

Respecting wetting agents, any one of a great variety of the surface active agents well known in the chemical industries and represented by various modified organic sulfates and sulfonates may be employed. Of these we have found very desirable alkyl-aryl sulfonates such as Nacconol NR manufactured by National Aniline & Chemical Co., Inc.

As to corrosion inhibitors, while the disclosed compositions employing any of the various phosphites are in themselves relatively non-corrosive, in respect to such metals as aluminum, cadmium-plated steel, bare steel and the like, nevertheless it may be desirable to add corrosion inhibitors to assure adequate overcoming of corrosion. One very desirable corrosion inhibitor for this purpose is mercaptobenzothiazol. Other appropriate corrosion inhibitors include potassium chromate and cyclo hexylamine nitrite.

In the light of the indicated possible desirable modifications above indicated, the additional following examples of very useful compositions are furnished:

Example F:

| | Percent |
|---|---|
| Tri-2-propyl phosphite | 5.0 |
| Methylene chloride | 73.9 |
| Methyl cellulose | 0.5 |
| Ethyl alcohol | 20.0 |
| Paraffin wax | 0.1 |
| Wetting agent (e. g. alkyl aryl and sulfonate) | 0.5 |
| | 100.0 |

Example G:

| | |
|---|---|
| Tri-iso-octyl phosphite | 10.0 |
| Methyl cellulose | 1.0 |
| Isopropyl alcohol | 15.0 |
| Paraffin wax | 1.0 |
| Wetting agent | 1.0 |
| Trichlorethylene | 72.0 |
| | 100.0 |

Example H:

| | |
|---|---|
| Tri-butyl phosphite | 12.0 |
| Methyl cellulose | 2.0 |
| Paraffin wax | 1.0 |
| Wetting agent | 2.0 |
| Methyl alcohol | 10.0 |
| Ethylene dichloride | 23.0 |
| Methylene chloride | 50.0 |
| | 100.0 |

From the foregoing examples F, G, and H, it will be noted that the percentage of viscosity modifier is quite variable, although nevertheless relatively very small with respect to the phosphite and the solvent. Thus, methyl cellulose may be desirably used from about 0.5% to about 2%. Probably about 2% to 3% is an economical and commercial maximum, and probably around 0.2% to 0.3% is about an effective minimum, these figures being based on the entire composition. As to the use of alcohol as a partial substitute for the halogenated hydrocarbon, 10% to 20% would probably be representative of an appropriate range for any such alcohol to be employed, although considerably less than 10% might be employed and perhaps it would be feasible to raise the alcohol proportion to as much as 25% to 30% while still retaining relatively good composition characteristics.

Where wetting agents are employed, as is characteristically true in the employment of wetting agents for most purposes where they are desirable, the proportion again is relatively low, for example between about 0.5% and 2%, as in the case of the viscosity modifier, although as little as about 0.2% has some effectiveness with many of the wetting agents, and it might be feasible, at least in some instances, to use up to around 3% which is probably the practical and economic maximum. From the standpoint of a vapor pressure depressant, the object is to use as little of such material as possible in order to obtain the desired effect, this being especially true when such materials as paraffin wax are employed. Thus, as indicated in examples F, G and H, perhaps 1% is a desirable maximum, and perhaps about 0.1% is as little as will produce a desired result. Of course, such minor variations in these percentages may be used as will be understood by the skilled chemist.

Referring now particularly to the phosphites hereinbefore disclosed as the significant activators in desealants of this improvement, these may be the previously indicated primary, secondary and tertiary phosphites expressed by the class formulae respectively as follows:

(1)          $ROPO_2H_2$
(2)          $(RO)_2POH$
(3)          $(RO)_3P$

The symbol R represents the previously indicated organic groups of either alkyl or aryl constitution. Corresponding thiophosphites may similarly be employed where an oxygen is replaced by a sulfur. Similarly halo-phosphites or thiophosphites may be employed, an OH group, for example, being replaced by the halogen, such as bromine or chlorine.

Respecting the above classes of phosphites, any alkyl or aryl phosphite is usable which will yield an adequately soluble or dispersible material in the indicated chlorinated hydrocarbon solvents. Since alkyl groups representing about 18 or more carbon atoms per molecule may be excessively heavy, alkyls as claimed herein may be considered as containing one or more but less than about 18 carbon atoms per molecule. A similar statement applies to the aryl groups, with the limitation that three aromatic nuclei represent the upper limit of usable aromatic nuclei per molecule in the respective phosphite. Therefore the term "aryl" as used herein represents such limits.

As previously indicated, the desealants in accordance with this invention may be used, and preferably are used, by spraying them under pressure into the coated tanks from which the sealing coating thereof is to be removed, the liquid being pumped through spray nozzles, which may be rotating nozzles if desired, the liquid being continuously drained from the tank being treated, strained, and recirculated until cleaning is complete. Cleaning may include partial mechanical stripping. As also previously indicated, these desealants may also be employed in connection with the so-called fill-and-drain method where the tanks are allowed to stand for a considerable period of time, for example twenty-four hours or more, the tanks being then drained and the loosened sealant material removed mechanically.

Where the term "phosphite" has been used herein without additional restriction, it is intended that it shall be inclusive of phosphites of the above typical primary, secondary and tertiary formulas, of corresponding thiophosphites, and of corresponding halogenated phosphites and thiophosphites mentioned. In using compositions of this invention, operations are commonly carried on at normal temperatures, or somewhat higher temperatures but below the boiling point of the liquid. While it has been indicated that suitable compositions employ about 1% to 20% of the selected phosphite and about 80% to 99% of a liquid halogenated hydrocarbon, a portion of the halogenated hydrocarbon solvent may be replaced by an indicated alcohol; for example, 10% to 20% of the total composition may be such alcohol. Quite commonly about 5% of the phosphite is employed. Where an indicated alcohol is employed as part of the solvent, the chlorinated hydrocarbon may then be considerably less than the indicated 80%. For example, it may be only in the order of 70% or 75%, as examples F, G, and H above would indicate.

We claim as our invention:

1. A desealant composition consisting essentially of: a chlorinated hydrocarbon liquid solvent in the proportion of about 99% to about 80%; and an organic phosphite in the proportion of about 1% to 20%.

2. A composition as in claim 1 wherein organic groups of the phosphite are alkyl groups containing at least one but less than eighteen carbon atoms.

3. A composition as in claim 1 wherein organic groups of the phosphite are aryl groups containing not more than three aromatic nuclei.

4. A composition as in claim 2 wherein the organic phosphite is an organo-halo phosphite.

5. A composition as in claim 2 wherein the organic phosphite is an organo-thiophosphite.

6. A composition as in claim 2 wherein the organic phosphite is an organo-halo-thio phosphite.

7. A composition as in claim 3 wherein the organic phosphite is an organo-halo phosphite.

8. A composition as in claim 3 wherein the organic phosphite is an organo-thio phosphite.

9. A composition as in claim 3 wherein the organic phosphite is an organo-halo-thio phosphite.

10. A desealant composition comprising essentially: an organic phosphite in the proportion of about 5% to 20%; and a liquid solvent in the proportion of about 70% to 95%, at least the major proportion of such solvent being a halogenated hydrocarbon selected from the class consisting of chlorinated and brominated hydrocarbons.

11. A desealant composition as in claim 10 containing also minor proportions of a wetting agent, a wax vapor pressure depressant, and a cellulosic viscosity modifier.

12. A desealant composition as in claim 10 wherein an appreciable proportion of said liquid solvent is an aliphatic alcohol having a maximum chain length of six carbon atoms.

13. A desealant composition as in claim 10 wherein the phosphite is tri-2-propyl phosphite.

14. A desealant composition as in claim 10 wherein the phosphite is triethyl phosphite.

15. A desealant composition as in claim 10 wherein the phosphite is tributyl phosphite.

16. A desealant composition comprising essentially: a phosphite selected from the class consisting of alkyl phosphites, aryl phosphites, alkyl and aryl thiophosphites, halo-alkyl and halo-aryl phosphites, and halo-alkyl and halo-aryl thiophosphites, in the proportion of about 1% to 20%; and a liquid solvent in the proportion of about 99% to 70%, at least the major proportion of such solvent being a halogenated hydrocarbon selected from the class consisting of chlorinated and brominated hydrocarbons.

17. A composition as in claim 16 wherein the alkyl and aryl groups do not exceed 18 carbons per molecule.

18. A desealant composition as in claim 16 wherein such solvent includes alcohol in the proportion of about 5% to 20% of the composition, said alcohol having a maximum chain length of six carbon atoms.

19. A method for removing synthetic rubber sealant lining from a fuel tank surface including: treating such synthetic rubber lining with a liquid composition containing from about 1% to 20% of an organic phosphite and a liquid solvent in the proportion of about 70% to 99%, of which solvent a major proportion is a halogenated hydrocarbon selected from the class consisting of chlorinated and brominated hydrocarbons, the extent of treatment being such as to remove sealant lining from said surface; and withdrawing solution containing dissolved-disintegrated lining.

20. A method as in claim 19 wherein the sealant lining being removed is selected from the class of synthetic rubbers consisting of polymeric reaction products of organic dihalides and inorganic polysulfides and co-polymers of butadiene and acrylonitrile.

21. A method as in claim 19 wherein said liquid composition is forcibly ejected against said lining in the tank, is withdrawn from the tank, and is repeatedly recycled, ejected against said lining, and withdrawn until said sealant lining is completely removed.

References Cited in the file of this patent

UNITED STATES PATENTS

| | | |
|---|---|---|
| 2,437,964 | Marling | Mar. 16, 1948 |
| 2,653,116 | Whitcomb et al. | Sept. 22, 1953 |
| 2,749,321 | Ham | June 5, 1956 |
| 2,750,351 | Bear | June 12, 1956 |

FOREIGN PATENTS

| | | |
|---|---|---|
| 361,217 | Great Britain | Nov. 19, 1931 |
| 446,147 | Great Britain | Apr. 24, 1936 |

OTHER REFERENCES

Methocel, pages 17–24, published by Dow Chemical Co., Midland, Michigan (1949).

Industrial Solvents—Mellan, Reinhold Pub. Co., New York, 2nd ed., 1950, pages 152, 153, 156, 157, 314, 315 and 335–338.